US008307064B2

(12) United States Patent
Peer (10) Patent No.: US 8,307,064 B2
(45) Date of Patent: Nov. 6, 2012

(54) METHODS AND APPARATUS FOR AUTOMATED SOFTWARE GENERIC INFORMATION RETRIEVAL (75) Inventor: Francis Wayne Peer, Aldie, VA (US)

(73) Assignee: Verizon Services Corp., Ashburn, VA (US)

(*) Notice: Subject to any disclaimer, the term of this patent is extended or adjusted under 35 U.S.C. 154(b) by 1085 days.

(21) Appl. No.: 10/434,050

(22) Filed: May 8, 2003

(65) Prior Publication Data
US 2004/0167976 A1    Aug. 26, 2004

Related U.S. Application Data (60) Provisional application No. 60/449,130, filed on Feb. 21, 2003.

(51) Int. Cl.
G06F 15/173 (2006.01)

(52) U.S. Cl. .................................. 709/224; 709/223

(58) Field of Classification Search ............. 707/1, 168, 707/170; 709/217, 223, 224, 227, 250; 717/168, 717/170
See application file for complete search history.

(56) References Cited

U.S. PATENT DOCUMENTS

| | | | | |
|---|---|---|---|---|
| 5,923,850 A * | 7/1999 | Barroux | | 709/224 |
| 6,073,161 A * | 6/2000 | DeBoskey et al. | | 709/200 |
| 6,826,683 B1 * | 11/2004 | Suermondt et al. | | 713/100 |
| 6,993,559 B2 * | 1/2006 | Jilk et al. | | 709/206 |
| 7,113,934 B2 * | 9/2006 | Levesque et al. | | 707/1 |
| 2002/0120734 A1 * | 8/2002 | Riosa et al. | | 709/224 |
| 2002/0169734 A1 * | 11/2002 | Giel et al. | | 706/45 |
| 2003/0074358 A1 * | 4/2003 | Sarbaz et al. | | 707/10 |

OTHER PUBLICATIONS

Derodeff, Colby. "Got Correlation? Not Without Normalization." ArcSight, Inc. 2002.*

* cited by examiner

Primary Examiner — Scott Christensen (57) ABSTRACT

Methods and apparatus for retrieving software information, e.g., generic information such as version numbers, etc., from network elements in an automated fashion are described. A control server communicates with network elements in an automated manner at scheduled intervals. The control server establishes a communication session with a network element, e.g., a Telnet session, and retrieves software information at the scheduled intervals. The communication session may include logging into the network element, retrieving software generic information, and then logging out. Collected generic information is analyzed to detect changes. E-mail notifications of detected changes is supported. Collected information is maintained in a database which is accessible to authorized individuals via the Internet. Alarms are generated when detected changes result in software combinations known to produce errors. A log of network errors is maintained along with information indicating when software was changed to facilitate detection of the cause of errors.

20 Claims, 5 Drawing Sheets

METHODS AND APPARATUS FOR AUTOMATED SOFTWARE GENERIC INFORMATION RETRIEVAL

RELATED APPLICATIONS

The present application claims the benefit of provisional patent application Ser. No. 60/449,130 which was filed Feb. 21, 2003 and has the same title as the present application and is hereby expressly incorporated by reference.

FIELD OF THE INVENTION

The present invention is directed to network management, and more particularly, to methods and apparatus for retrieving software information, e.g., generic information such as version numbers, etc., from network elements in an automated fashion and for using the retrieved information.

BACKGROUND OF THE INVENTION

Communications networks are an important part of today's society. Networks can be used to couple numerous network elements, e.g., workstations, to share network resources such as Internet connection and running service simulations. Such workstations often run UNIX or another operating system as well as various programs, e.g., communication routines. Networks where large numbers of elements run UNIX are sometimes called UNIX networks. Maintenance of data, e.g., configuration management data, in a communication network is an important task. Accurate and timely collection of management information is important since many applications may use such information. Part of an ISO process for maintaining a UNIX based network entails the creation and maintenance of configuration management data. Creation of this configuration management data includes gathering current software generic information from the network elements in the network. The generic information may include a list of applications loaded onto a network node along with versions and/or date information relating to each software application. In many cases gathering current software generic information is done manually. Therefore, information collection can be slow and sometimes the data is out of date.

Telephone services are often provided through the use of one or more software programs executed by nodes in a telecommunications network such as the Public Switched Telephone Network (PSTN). Such services are frequently broken or suffer unexpected errors due to the introduction of new software releases and/or patches installed on network elements. Changes to software of this type are reflected in changes in generic information corresponding to the software used at the various network nodes.

When relied upon for making software deployment decisions, out of date generic information in a network management database can lead to software deployments that may produce problems in the network, such as incompatibility between network elements, that could have been predicted if up to date generic information had been easily available.

In view of the above, there is a need for methods and apparatus that can be used to automatically retrieve, e.g., collect, software information from the elements of a network. In addition there is a need for the methods and apparatus that can identify changes in network elements that may adversely affect other parts of the network. If errors or changes in the network are detected, it would be beneficial if appropriate individuals could be notified so that detected errors can be corrected and any problems caused by changes to network elements predicted and resolved. To aid prospective network clients and testers in locating network elements having a particular software release to test or retest their services or to attempt to reproduce problems encountered in the field, it is desirable that collected network information be stored in an easy to access database.

SUMMARY OF THE INVENTION

The present invention is directed to network management, and more particularly, to methods and apparatus for retrieving software information, e.g., generic information such as version numbers, etc., from network elements in an automated fashion and to methods for using the retrieved information.

Networks comprise numerous elements each of which may execute one or more software applications. Generic information about software applications, e.g., software version, creation date, etc., is often used to assess overall compatibility between various network elements, to detect potential causes of errors in the network and/or in the scheduling and conducting of various network testing and updating procedures.

The manual collection of generic information, e.g., by a human individual accessing individual network nodes, is a time consuming process. In addition to the time consuming nature of collecting software generic information, due to delays in the manual collection of such information, the data resulting from a collection process which is directly dependent on human involvement in the data collection process often results in out of date information.

In accordance with the present invention, the collection of software generic information from network elements, e.g., network nodes, is conducted in an automated manner according to a set schedule. Once started, generic information from a plurality of network elements is collected without the need for human involvement or oversight. Collected generic information is stored in a database along with information about the time each information collection operation was performed.

In one exemplary embodiment of the present invention, Telnet communications sessions are used to obtain generic information from individual network elements. Telnet, while being a relatively old standard, has the advantage of being supported by a wide range of network devices. Accordingly, for compatibility reasons in at least one particular embodiment, newer communications protocols are ignored in favor of the older Telnet standard.

Once collected, software generic information is compared to previously collected generic information to identify changes in network elements. Detected changes are analyzed to determine if they will result in known compatibility problems or otherwise are likely to cause errors. Alarms are generated when compatibility problems and/or conditions likely to produce errors are detected.

In accordance with one feature of the present invention, when a change or alarm condition is detected, E-mail notifications of the detected changes and/or generated alarms are automatically sent to individuals who are on a list to be notified in the event of one or more detected changes or alarms. Different E-mail notification lists may be used for different types of detected changes and/or alarms. The individuals notified of changes may be those individuals responsible for network testing, maintenance or insuring compatibility between different network elements.

In the above described manner, E-mail notification alerts are used to notify concerned individuals of changes in the network while the web information allows prospective network users and testers to locate network elements having a particular software release so that they can test or retest their services on the network element in conjunction with the software or attempt to reproduce problems encountered in the field.

In addition to E-mail notification of detected software changes, in accordance with the present invention, a database of collected software generic information is stored and made available via the Internet. Access to the database may be restricted through the use of passwords, encryption or other known security techniques. By way of the Internet, the database can be accessed from various locations by individuals needing the information, e.g., to perform network tests or perform diagnostic operations.

Included in the database, for each network element, is software generic information and the time the information was collected. By maintaining a list of such information, along with a list of detected network errors and the time of the error, errors can be correlated to detected changes in software on one or more network elements.

The methods and apparatus of the present invention are particularly well suited for use in managing network elements which comprise part of the public switch telephone network where software changes can produce telephone service problems and legacy equipment requires the use of relatively old communications protocols for interacting with previously deployed network elements, e.g., telephone switches.

Numerous additional features, benefits and details of the methods and apparatus of the present invention are described in the detailed description which follows.

DETAILED DESCRIPTION

Figure 1:
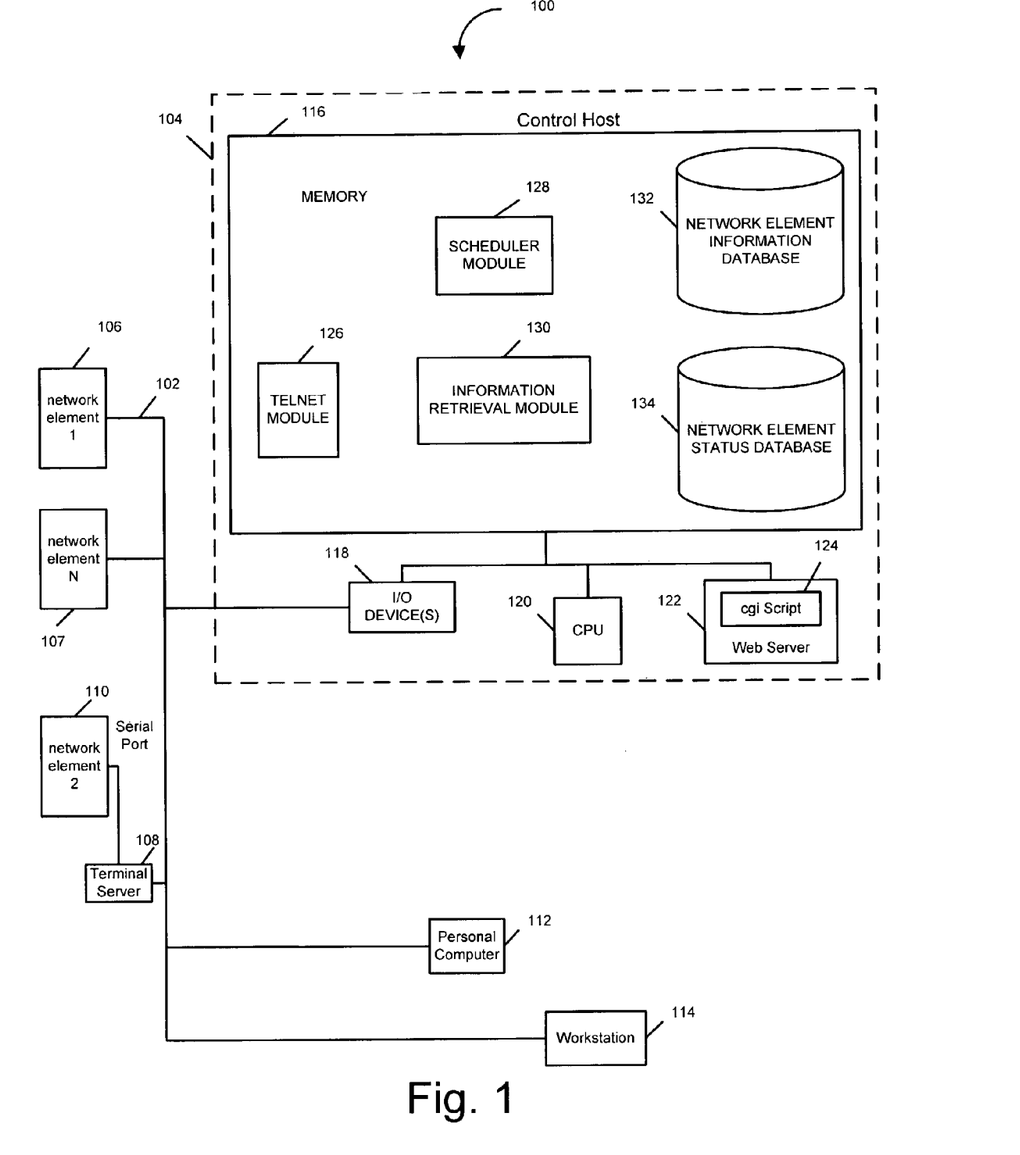
FIG. 1 illustrates a communications system implemented in accordance with the present invention.

FIG. 1 illustrates a communications system 100, e.g., a UNIX based network, implemented in accordance with the present invention. System 100 includes first through N network elements 106, 110, a personal computer 112, a workstation 114 and a control host 104, coupled together by a communication channel, e.g., channel bus, 102. A terminal server 108 couples the second network element 110 to the communication channel 102. The terminal server 108 acts as a network interface, which performs protocol conversions. The network connection 102 may be any number of known techniques for connecting a network, e.g., Ethernet.

Network elements 106, 107, 110 may be any one of a plurality of different devices such as a personal computer, a workstation, a server, etc., from which software information, e.g., generic information, may need to be retrieved. Second network element 110 represents an older machine that uses a serial port for communications. Therefore, communication with network element 110 is conducted through terminal server 108 which serves to convert between formats and/or protocols supported by the second network element and those used on communication channel 102. Personal computer 112 and workstation 114 may be used by authorized personnel to view the results of an information retrieval method of the present invention, e.g., using a Web browser application executed thereon.

Control host 104 may be, e.g., a UNIX control host. The control host includes memory 116, CPU 120, Input/Output (I/O) device(s) 118 and web server 122. Web server 122 includes a CGI script. The control host 104 manages the network elements 106, 107, 110, and may be used to collect network information and perform maintenance procedures. The control host 104 implements information retrieval process of the present invention.

Under control of the CPU 120 and various modules stored in memory 116, the control host 104 can execute a number of operations to perform the information retrieval process of the present invention. Control host 104 can also access and manipulate databases for storing relevant information such as the retrieved software generic information. Memory 116 includes a telnet module 126, a scheduler module 128, an information retrieval module 130, a network element information database 132 and a network element status database 134.

The Telnet module 126 can execute operations to initiate communication between the control host 104 and different network elements 106, 107, 110 using the well known Telnet standard. The scheduler module 128, which is implemented as a UNIX cron scheduler in some embodiments, lists the network elements that will be queried for information and the frequency and/or times, at which the information is to be gathered, e.g., once each hour. Network element information database 132 stores information relating to the individual network element, e.g., the network address of a particular device, the protocol to be used in contacting the elements, login information, etc. Network element status database 134 includes information such as the collected software generic information. Exemplary embodiments of the network element information database 132 and the network element status database 134 will be discussed later with respect to FIGS. 4 and 5, respectively.

The control host 104 communicates with the network 102 through Input Output device I/O device 118. I/O device 118 may be, e.g., a Network Interface Card (NIC), that may be used with known networking techniques such as Ethernet.

In accordance with the invention the information obtained by implementing the retrieval process of the invention is made available to authorized users so that potential clients or testers can use the information to identify network elements having particular software releases, e.g., for testing software compatibility or for updating purposes. The information can also be used when attempting to reproduce problems encountered in the field, e.g., as a part of a diagnostic operation.

Web server 122, operating under control of the CGI Script 124, allows the results of the information retrieval operation of the present invention to be accessed by authorized users, through, e.g., personal computer 112 and workstation 114. Such access operations may be via Internet connecting to the server 122.

Figure 2:
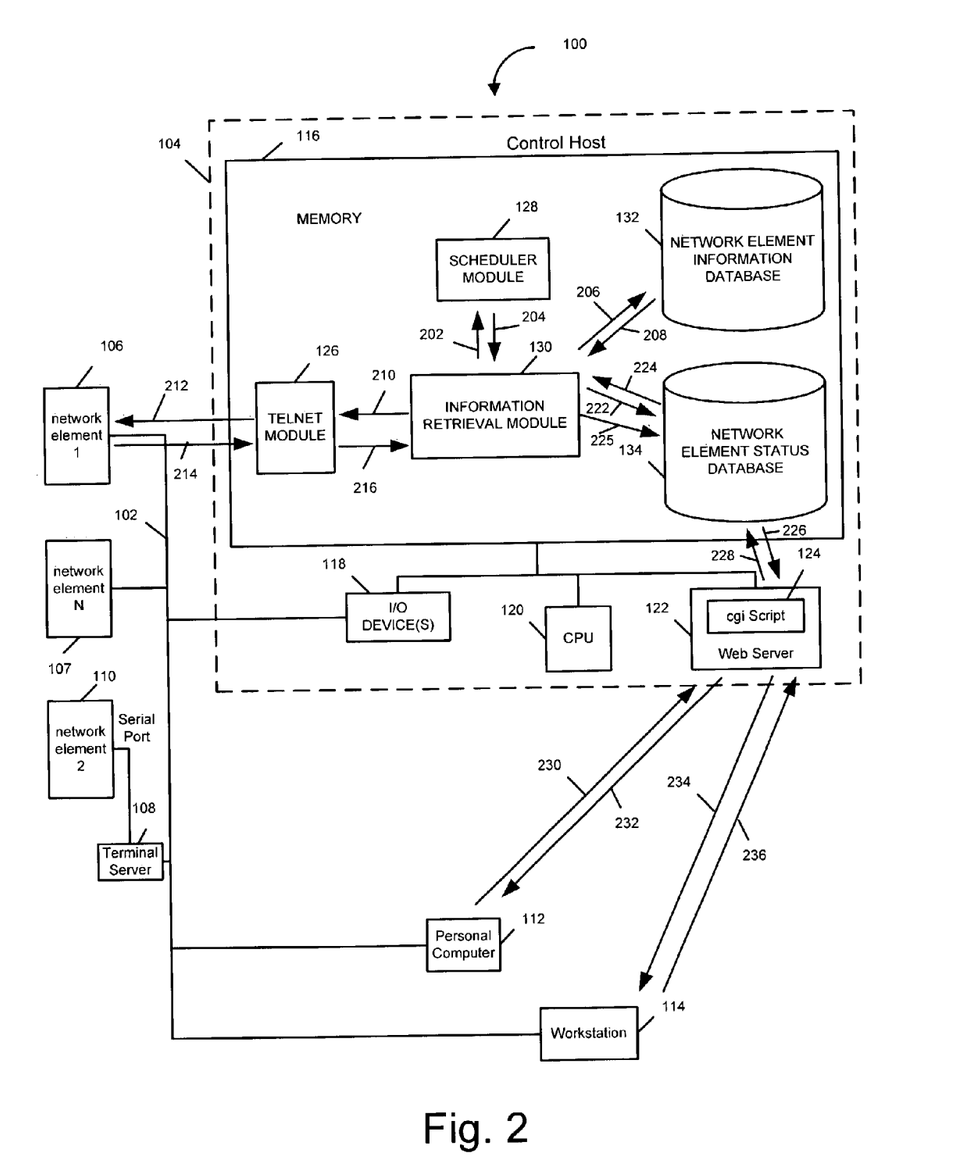
FIG. 2 illustrates a communications system implemented in accordance with the present invention with arrows representing processing between network elements.

FIG. 2 illustrates the communication system 100 of FIG. 1 with arrows used to represent the communication between various system elements. Each arrow corresponds to an operation performed as part of the information retrieval process of the present invention.

Figure 3:
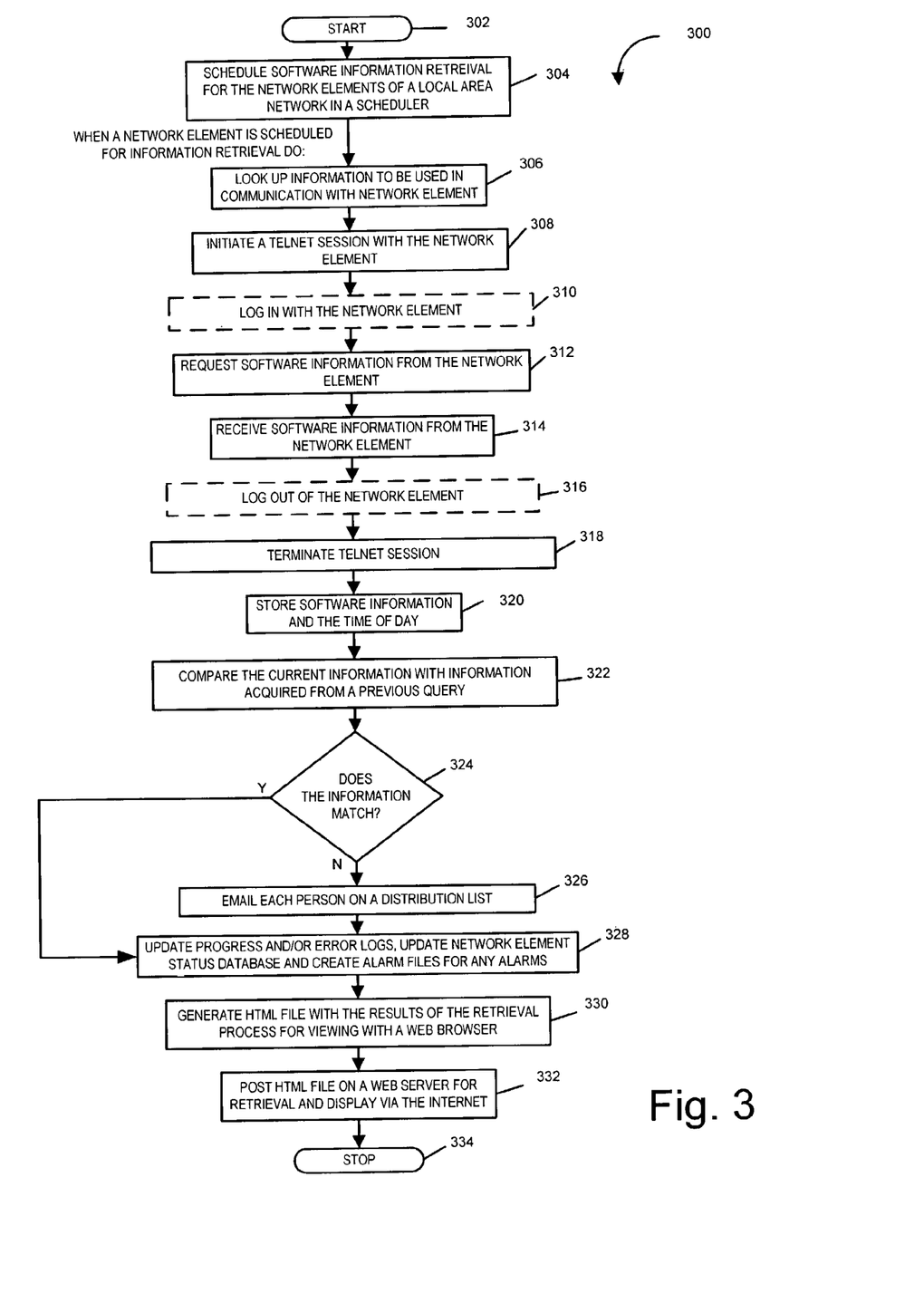
FIG. 3 is a flow diagram illustrating the information retrieval method of the present invention.

FIG. 3 shows the steps of an exemplary information retrieval method of the present invention. The method 300 will be described with periodic reference to the system diagram of FIG. 2, which shows communication signals corresponding to various method steps.

Method 300 is implemented by the control host 104 when operating under the direction of information retrieval module 130.

The method 300 starts in step 302, e.g., with the system components of FIG. 1 being activated. In step 304, processing proceeds by placing the network elements of the local area network (LAN) into a scheduler module 128 or by activating an existing schedule. This is represented in FIG. 2 by arrow 202. In the case of a UNIX environment, the scheduler module 128 may be a cron scheduler. The scheduler module 128 lists the network elements from which information is retrieved. It also stores information indicating the frequency at which an information retrieval operation is to be performed, e.g., once every hour or once every day, etc.

When a network element, e.g., network element 1 106, is scheduled for information retrieval, the scheduler module 128 informs the information retrieval module 130 and processing proceeds to step 306. The notification sent to the retrieval module 130 that a network element is scheduled for information retrieval is represented by arrow 204 in FIG. 2.

In step 306, processing proceeds by retrieving information to be used in communicating with the network element from the information database 132. This information may include the network address, e.g., TCP/IP address, of the network element 106, information about the communication protocol to be used for the retrieval operation, login information such as a password, etc.

In FIG. 2, arrows 206 and 208 represent the communication of a database access request and the return in step 306. The returned information includes the network element's network address and the network element type information. If a login is required, the login and any needed password information are also retrieved from the network element information database 132.

Following retrieval of the information in step 306, a Telnet session in step 308 is initiated with the network element using the obtained network address and any other necessary information. In FIG. 2, arrow 210 represents the control host 104 transmitting signals to the Telnet module 126 to initiate a Telnet session with the network device from which information is to be retrieved. Arrow 212 represents the Telnet module 126 transmitting a signal to network element 106 as part of the process of establishing a Telnet session with network element 106.

If it is determined that a login is necessary, in step 310, control host 104 under control of information retrieval module 130 uses the login and password information obtained from the network element information database 132 to login with the network element.

In step 312, the information retrieval operation 300 proceeds by requesting software information, e.g., generic, version number, etc., from the network element. This may be done using expect-send sequences. Next, in step 314, the software information is received by the control host 104. The communication of the software information to the control host is represented by arrows 214 and 216 in FIG. 2.

After the control host 104 receives the software information from the network element, in step 316, if a login was performed with the network element in step 310, the control host 104 logs out of the network element. Then, in step 318 the Telnet session is terminated.

In step 320, the control host 104 stores the received software information along with the current date and time. Then, in step 322, the retrieved information is compared with information acquired from a previous query obtained from network element status database 134 in an attempt to identify changes.

Figure 5:
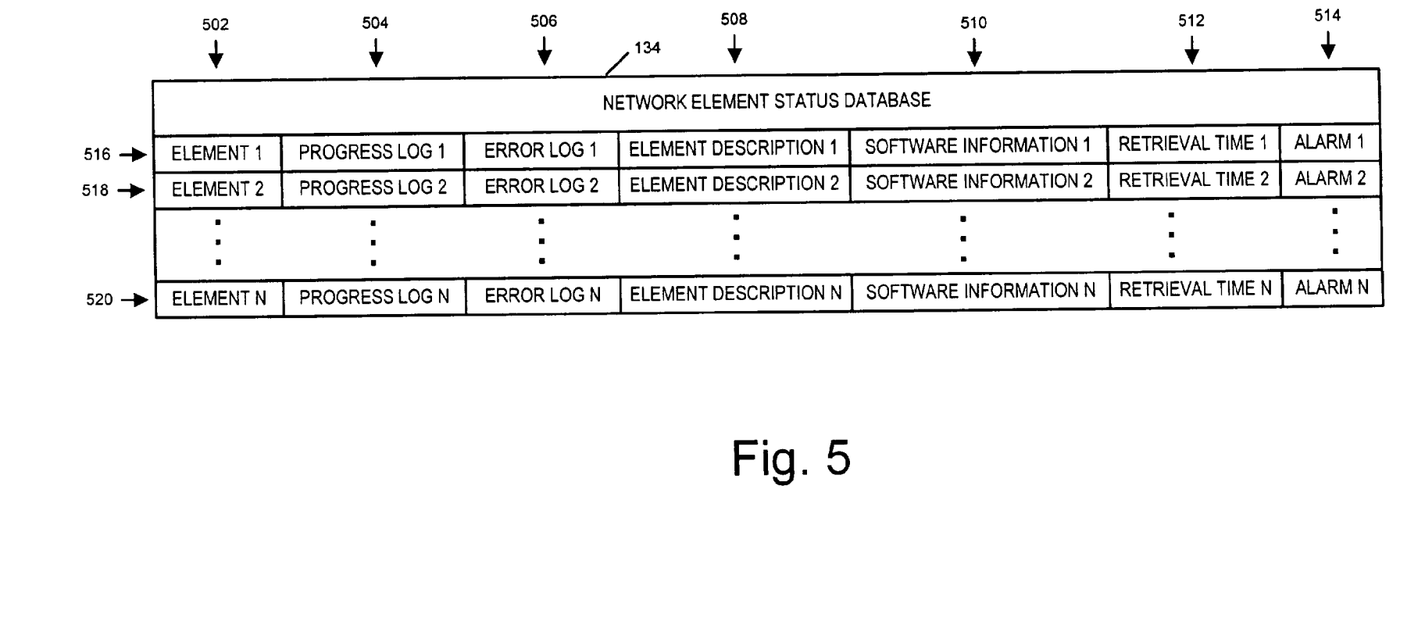
FIG. 5 illustrates an exemplary network element status database implemented in accordance with the present invention.

Each of the rows 516, 518, 520 of database 134 represent the stored status information pertaining to a different one of the network elements.

The communication of a data retrieval request and the return of information from the network element status database 134 is represented in FIG. 2 by arrows 222 and 224. In decision step 324, the control host 104 compares the retrieved software information with previously retrieved information. As a result of the comparison, software changes, e.g., changes in version numbers are identified.

If there is no difference between the previously retrieved software information and the currently retrieved software information, processing proceeds directly to step 328. In the case where a difference is detected between the two software generics, processing proceeds to step 326.

In step 326, a distribution list of email addresses for a network element is accessed from the network element information database 132. Then, the control host 104 emails the people on the list to inform them of the detected problems and/or changes. By informing people of any changes in software generic, they can be forewarned in case trouble begins to develop consistent with the time new software was loaded, they can be notified when a patch they had been waiting for has been installed, and they can evaluate when re-testing or regression testing of existing services may be required.

In step 328, the control host 104 updates progress and/or errors logs and creates alarm files for any alarms that may have been triggered. Alarms may be triggered by particular software changes. As part of creating and/or updating alarm files, the retrieved software generic information is compared to known information about software combinations that are problematic. This information may be obtained from the network device information database or from another set of data, e.g., in control server's memory. When a match is found between a known problematic software combination and the retrieved software generics information, an alarm is generated in step 328. Arrow 225 in FIG. 2 represents the communication of error log and other update information to database 134 for storage.

From step 328 operation proceeds to step 330 wherein the control host 104, under control of information retrieval module 130, generates an HTML file including the results of the retrieval process. Then, in step 332, the control host 104 posts the HTML file on a web server. This allows the HTML file to be accessed via the Internet. A CGI script may be used to display the periodically changing information. Arrows 226 and 228 in FIG. 2 are used to represent signals associated with the Web Server 122 being supplied with the generated HTML file.

In another embodiment, to ensure that the information provided to the accessing party is current, a CGI script is used to generate an HTML file including the current information each time the information is requested. It is this file that is then provided to the accessing party for viewing.

Making the results of the retrieval process available on the Internet allows authorized users to access the retrieved information along with any error logs or alarms that may have been generated from a variety of convenient locations, e.g., from virtually any location where there is Internet access. For example in FIG. 2, personal computer 112 and workstation 114 can both access the information of a retrieval process, e.g., in response to a received email. Arrows 230 and 232 represent the personal computer 112 accessing information retrieval reports from web sever 122 and arrows 234 and 236 represent the personal workstation 114 accessing information retrieval reports from web sever 122. As discussed above, such access may be via the Internet.

Operation of information retrieval operation 300 stops in step 334, but the control host 104 remains active inputting new network elements in the scheduler and retrieving software information from network elements at the times indicated by the scheduler 128.

Figure 4:
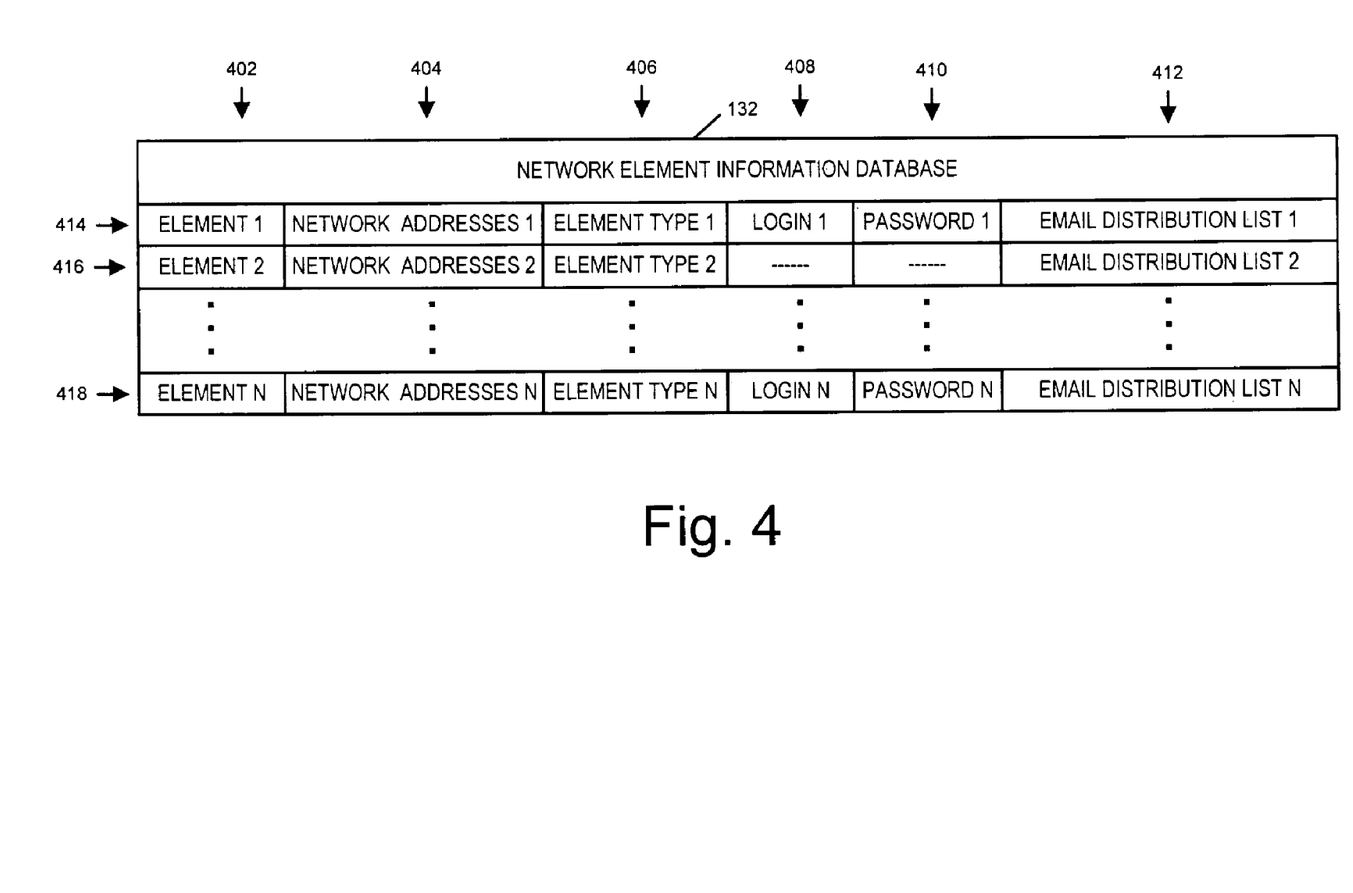
FIG. 4 illustrates an exemplary network element information database implemented in accordance with the present invention.

FIG. 4 illustrates an exemplary network element information database 132. Each row 414, 416, 418 includes information corresponding to a different network element. Each of the first through sixth columns 402, 404, 406, 408, 410, 412 corresponds to a different type of information.

The first column 402 includes an element identifier, which identifies the network element to which the row of data corresponds. The second column 404 includes network address information. The fourth column 406 includes information identifying the type of network element. This information may include information indicating the type of communications protocol or signaling to be used when communicating with the network element. The fourth column includes login information, e.g., a login script, to be used when contacting the corresponding network element for information retrieval purposes. Some devices may not require the use of such scripts in which case the information is omitted from the database. The fifth column 410 includes password information that is used in cases where a password is required, e.g., for use in conjunction with a login script. For some devices passwords may not be required. Passwords are omitted from the database for such devices.

The last column 412 includes an E-mail distribution list. Each distribution list identifies parties who are to be sent information retrieved from the network element to which the distribution list corresponds. Each list many include zero, one or more E-mail address used for routing retrieved information in accordance with the invention. EMAIL distribution lists may be omitted where there are no E-mail recipients who are to receive information corresponding to a particular device.

A review of FIG. 4 shows that a full set of information is included for elements 1 and N in rows 414, 418 while for element 2, login information and a password are omitted since they are not required to retrieve information.

An exemplary network element status database 134 implemented in accordance with the present invention is shown in FIG. 5. The columns of the database 134 include elements 502, progress logs 504, error logs 506, network element descriptions 508, software information 510, retrieval times 512 and alarms 514. Each row of FIG. 5 corresponds to a different network element. The first row 516 corresponds to network element 1 106, the second row 518 corresponds to network element 2 110, while the third row 520 corresponds to network element N.

Each column of FIG. 5 corresponds to a different type of data or information that may be stored for a network element corresponding to a particular row. The first column 502 includes an element identifier which identifies the network element to which a particular row of data corresponds. The second column 504 shows a progress log maintained for the corresponding network element. The progress log corresponding to a network element includes information on the success/failure of attempts to retrieve network element information from the corresponding network element. The third column 506 includes error logs, one per network element. Each elements error log includes information about detected or reported errors.

Such a log can be useful in detecting errors caused by changes in software versions. For example, by correlating detected and/or reported errors with software version change information, a system administrator can often quickly identify errors that are the result of software version changes in one or more network elements.

The fourth column 508 includes information which describes the corresponding network element. This is useful when attempting to assess what impact changes in a particular software version may have on a particular network element. Based on the element description information, in some cases, it is possible to determine which modules of a particular software application will be executed by the network element. This facilitates network diagnostics and, in some cases, allows errors in a particular software version to be isolated to particular modules or submodules, simply be comparing the error logs of different network elements and understanding which software modules are executed by each element.

The fifth column 510 includes software information. This may be in the form of a list of software applications loaded on the corresponding network element, information on the particular modules of the listed software application which are used, and/or information about the version of each software application at the time a retrieval operation is performed. Accordingly, software information may include a different entry for each retrieval period, e.g., with the different software versions used at different times being reflected in the stored information. In addition to version number other software generic information, e.g., creation date, last access data, author, etc. may be stored in the set of software information maintained for each network element.

The sixth column of table 512 includes retrieval time information for each corresponding network element. For a given network element, the retrieval time information will indicate the date and time of each software information retrieval operation performed. Outdated information may be purged or shifted to a data archive, e.g., after a fixed period of time based on the retrieval time information 512. The retrieval tie information 512 is particularly useful when attempting to correlate network errors, e.g., errors included in the error logs of column 506, with software changes as reflected in changes in the software information corresponding to a particular retrieval operation.

The last column 514 of the database 134 includes alarm information for each corresponding network element. Alarms are generated when, e.g., a software change corresponding to a particular preset alarm condition is detected. For example, an alarm may be set so that it is triggered when a change to a specific program is detected. Alternatively, an alarm may be set to be triggered when one or more incompatible software application combinations are detected on a particular network element or combination of network elements. Each time a change in software is detected, a check to determine if an alarm is to be triggered. Alarms are also generated when software release information cannot be retrieved, such as when: communications paths are down, network elements are down or unresponsive, passwords to network elements have expired, or any other reason the information was unavailable. Column 514 includes a list of alarms to be detected. It also includes information on when an alarm is triggered based on information retrieved from one or more network elements. Maintaining a history of alarm information in accordance with the present invention facilitates detection of network errors and/or conditions which can lead to future errors.

The steps of the various methods of the invention discussed above may be implemented in a variety of ways, e.g., using software, hardware or a combination of software and hardware to perform each individual step or combination of steps discussed. Various embodiments of the present invention include means for performing the steps of the various methods. Each means may be implemented using software, hardware, e.g., circuits, or a combination of software and hardware. When software is used, the means for performing a step may also include circuitry such as a processor for executing the software. Accordingly, the present invention is directed to, among other things, computer executable instructions such as software for controlling a machine or circuit to perform one or more of the steps or signal processing operations discussed above.

It is to be understood that numerous variations on the above described methods and apparatus are possible without departing from the scope of the invention.

What is claimed is:

1. A method of identifying whether network errors are caused by changes in software generics, the method comprising:
    scheduling retrieval of software generic information from at least two different network nodes;
    establishing a communications session with each of the network nodes at the time a software generic information retrieval operation is scheduled for the particular network node;
    retrieving from each network node software generic information pertaining to said node during the communications session established with said network node;
    storing the retrieved software generic information in a data base including software generic information retrieved from multiple nodes;
    receiving information on detected network errors from a network error information database;
    correlating the detected network errors with changes in software generics identified in the data base; and
    determining, based on the correlating, if any of the changes in software generics caused any of the detected network errors.

2. The method of claim 1, wherein establishing a communications session comprises logging into each network node.

3. The method of claim 2, wherein logging into the network node includes:
    transmitting a password to the network node from which software generic information is to be retrieved.

4. The method of claim 2, wherein logging into the network node includes:
    initiating a Telnet communications session with the network from which software generic information is to be retrieved.

5. The method of claim 2, wherein obtaining from the network node software generic information includes:
    receiving information identifying software elements loaded onto the network node and version information for each identified software element.

6. The method of claim 5, wherein the version information includes:
    a version number and a date associated with the identified software element.

7. The method of claim 1, further comprising:
    comparing retrieved software generic information to previously retrieved software generic information from the same network node to identify software changes.

8. A method of collecting and processing software generic information from a plurality of nodes in a network, the method comprising:
    scheduling retrieval of software generic information from at least two different network nodes;
    establishing a communications session with each of the network nodes at the time a software generic information retrieval operation is scheduled for the particular network node;
    retrieving from each network node software generic information pertaining to said node during the communications session established with said network node;
    storing the retrieved software generic information in a data base including software generic information retrieved from multiple nodes;
    identifying one or more software changes based on a comparison of the retrieved software generic information to previously retrieved software generic information from the same network node;
    comparing retrieved software generic information to information about known problematic software combinations based on the identified one or more software changes;
    determining if the retrieved software generic information indicates a problematic software combination based on the comparing of the retrieved software generic information to information about known problematic software combinations;
    based on a problematic software combination being determined, generating an E-mail notification message used to notify at least one E-mail recipient of the determined problematic software combination;
    receiving information on detected network errors from a network error information database; and
    correlating the detected network errors with the identified changes in software generics identified in the data base to identify whether the identified changes in software generics caused the network errors.

9. The method of claim 8, further comprising the step of:
    generating an alarm when said comparison indicates that a known problematic software combination exists.

10. The method of claim 9, wherein said comparing step is performed each time a change in software generic information is detected.

11. The method of claim 9, further comprising:
    generating a HTML page including information from information included in said software generic information database; and
    making the generated HTML page available via the Internet.

12. A method of collecting and processing software generic information from a plurality of nodes in a network, the method comprising:
    scheduling retrieval of software generic information from at least two different network nodes;
    establishing a communications session with each of the network nodes at the time a software generic information retrieval operation is scheduled for the particular network node;
    retrieving from each network node software generic information pertaining to said node during the communications session established with said network node;
    storing the retrieved software generic information in a data base including software generic information retrieved from multiple nodes;
    comparing the retrieved software generic information to information about known problematic combinations of two or more software applications;
    determining if the retrieved software generic information indicates a problematic combination of two or more software applications; and generating an alarm when said determining indicates that a known problematic software combination exists;
receiving information on detected network errors from a network error information database; and
correlating the detected network errors with changes in software generics identified in the data base to identify whether the changes in software generics caused the network errors.

13. The method of claim 1, further comprising:
generating a HTML page including information from information included in said software generic information database; and
making the generated HTML page available via the Internet.

14. A communications system, comprising:
a plurality of network nodes, each network node including:
   at least one software application having associated software generic information; and
   communications means for communicating with other network elements; and
a control server, the control server including:
   a scheduler for scheduling retrieval of software generic information from at least two different network nodes;
   communications means for establishing a communications session with each of the network nodes at the time a software generic information retrieval operation is scheduled for the particular network node and for retrieving from each network node software generic information pertaining to said node during the communications session established with said network node;
   a software generic information data base including software generic information retrieved from multiple nodes;
   a network error information data base including network errors correlated with the software generic information data base; and
   a processor for determining if any changes in software generics caused any of the network errors included in the network error database.

15. The system of claim 14, further comprising:
a network information database including a password used to login to at least one of said network elements.

16. The system of claim 15, further comprising:
a web server for supplying at least some of the information included in the software generic information data base to other devices via the Internet.

17. The system of claim 16, wherein the software generic information data base includes:
software generic information collected from network elements at regularly scheduled intervals.

18. The system of claim 17, wherein the network error information database also includes:
a log of network errors with time information indicating when said errors occurred.

19. The system of claim 17, wherein the control server includes E-mail addresses to which information about changes in software generic information is to be sent when a change in said software generic information is detected.

20. The system of claim 19, wherein the software generic information data base and the network information database are included in the control server.

* * * * *